United States Patent [19]

Nichols

[11] Patent Number: 5,002,194
[45] Date of Patent: Mar. 26, 1991

[54] FOLD UP WIRE FRAME CONTAINING A PLASTIC BOTTLE

[75] Inventor: Dwight E. Nichols, Beatrice, Nebr.

[73] Assignee: Hoover Group, Inc., Alpharetta, Ga.

[21] Appl. No.: 471,396

[22] Filed: Jan. 29, 1990

[51] Int. Cl.[5] .............................................. B65D 19/00
[52] U.S. Cl. ........................................ 220/1.5; 220/6; 220/401; 206/386; 206/485
[58] Field of Search ................ 220/401, 402, 1.5, 5 A, 220/6, 19; 206/386

[56] References Cited

U.S. PATENT DOCUMENTS

| | | | |
|---|---|---|---|
| 3,970,209 | 7/1976 | Baxter | 220/1.5 X |
| 4,106,626 | 8/1978 | Trubiano | 220/19 X |
| 4,165,024 | 8/1979 | Oswalt et al. | 206/386 X |
| 4,676,373 | 6/1987 | Schneider | 206/386 |
| 4,795,057 | 1/1989 | Jungels et al. | 220/1.5 X |
| 4,909,387 | 3/1990 | Schutz | 220/1.5 X |
| 4,930,661 | 6/1990 | Voorhies | 220/1.5 X |

Primary Examiner—Steven M. Pollard
Attorney, Agent, or Firm—Harness, Dickey & Pierce

[57] ABSTRACT

A reusable wire mesh shipping container for the one-way transportation of bulk liquid materials. The shipping container consists of a box like wire mesh outer container and a blow molded inner tank. The bottom wall of the outer container has dependent legs which are appropriately spaced so as to enable the extension of forklift tines thus promoting manipulation of the container. The side and bottom walls of the container are connected so as to permit the side walls to fold upon each other, and subsequently, upon the bottom wall. The container is secured in the folded position by the top wall. In the folded position, the container thereby occupies a minimum amount of transportation space during subsequent return to the original supplier.

5 Claims, 2 Drawing Sheets

FOLD UP WIRE FRAME CONTAINING A PLASTIC BOTTLE

BACKGROUND OF THE INVENTION

Numerous industries require the transportation and storage of bulk liquid materials. While a variety of large containers are presently used, the most common continues to be the conventional fifty-five gallon drum. Notwithstanding its popularity, the fifty-five gallon drum is known to have disadvantages, including the following: an inefficient use of storage and transportation space, difficulty in handling, the disposal of empty drums, and the necessity of inverting the drum for full discharge.

In recent years, the cubic shaped transportation container has gained increasing popularity. One variety consists of a cubic metal container having an inner, polyethylene tank. While demonstrating an efficient use of storage space, the cubic metal container has also shown limitations. During return, a vast amount of transportation space is "wasted" by the overall bulk of the empty metal container. From a cost standpoint, other limitations also exist. If recycling is desired, separation of the inner polyethylene tank from the outer metal containe is difficult. Additional cost reductions could be achieved through the use of an alternative material for the metal of the container.

Another recent development in bulk liquid transportation is the disposable shipping container. One such container is disclosed in U.S. Pat. No. 4,793,519, assigned to the assignee of the present application. The disposable shipping container of the referenced patent consists of a rectangularly shaped outer container formed of a corrugated paper material. Although less expensive than the previously mentioned metal containers, the corrugated paper container remains strong enough to permit shipping and stacking of the containers. A thin walled, unitary blow molded plastic inner tank lines the interior of th corrugated paper container. So constructed, the outer containe structurally supports and maintains the rectangular shape of the inner plastic tank. Unlike the metal container, upon being emptied the outer container and the inner tank are readily separated for disposing and recycling purposes.

A variation of the above referenced patent is embodied in U.S. patent application Ser. No. 274,425, filed Nov. 21, 1988, also assigned to the assignee of the present invention. In the referenced application, the outer container is constructed of a single layer of solid fiber paperboard. Instead of four distinct side walls, the container of the mentioned application consists of a single continuous upright side wall, rounded at the upright corners and secured to top and bottom walls by metal crimp rings.

While the referenced patent and application are both disposable and recyclable, in a long term continuous supply arrangement, the disposability and/or recyclability of the shipping container may not always be cost beneficial. It is therefore an object of the present invention to provide a reusable container for use in shipping bulk liquid materials one-way.

It is another object of the invention to provide a reusable, bulk liquid shipping container that is durable, yet inexpensive to construct.

It is a further object of the present invention to provide a reusable, bulk liquid shipping container which is capable of efficiently occupying a minimum amount of transportation space during subsequent return to the liquid supplier.

The shipping container of the present invention consists of a rectangularly shaped wire mesh outer container having a bottom wall, upright side walls and a substantially flat top wall. A unitary blow molded plastic inner tank is positioned upright and inside of the wire mesh outer container. While the side walls of the inner tank are substantially thin and thus prevented from being self-supportive, the wire mesh walls of the outer tank are constructed of a sufficient gage to structurally support the inner tank when it is filled with liquid. The inner tank is also equipped with an inlet fitting and a discharge fitting, respectively extending into fill and discharge openings in the wire mesh walls of the outer container.

To facilitate an increased ease in the handling of the container, the outer container has a number of dependent legs, mounted on its bottom wall, which are capable of receiving forklift tines. Additionally, the inner tank has two reinforced support regions positioned on its upper surface. The combination of the inner tank support regions and the gage of the wire mesh outer walls enables two full containers to be stacked upon one another.

The bulk liquid shipping container of the present invention demonstrates numerous advantages over shipping containers previously and presently used in the industry. Namely, the invention is reusable as a one-way shipping container. Upon complete discharge of the contents of the inner tank, a wall of the wire mesh outer container can be opened so as to readily permit the removal of the collapsed inner tank. The polyethylene inner tank may then be either discarded or recycled, whichever is most advantageous from a cost standpoint. Once the inner tank has been removed, the outer tank is capable of folding upon itself, to a substantially reduced height, for maximizing transportation space during return to the original supplier for subsequent reuse.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE DRAWINGS

Figure 1:
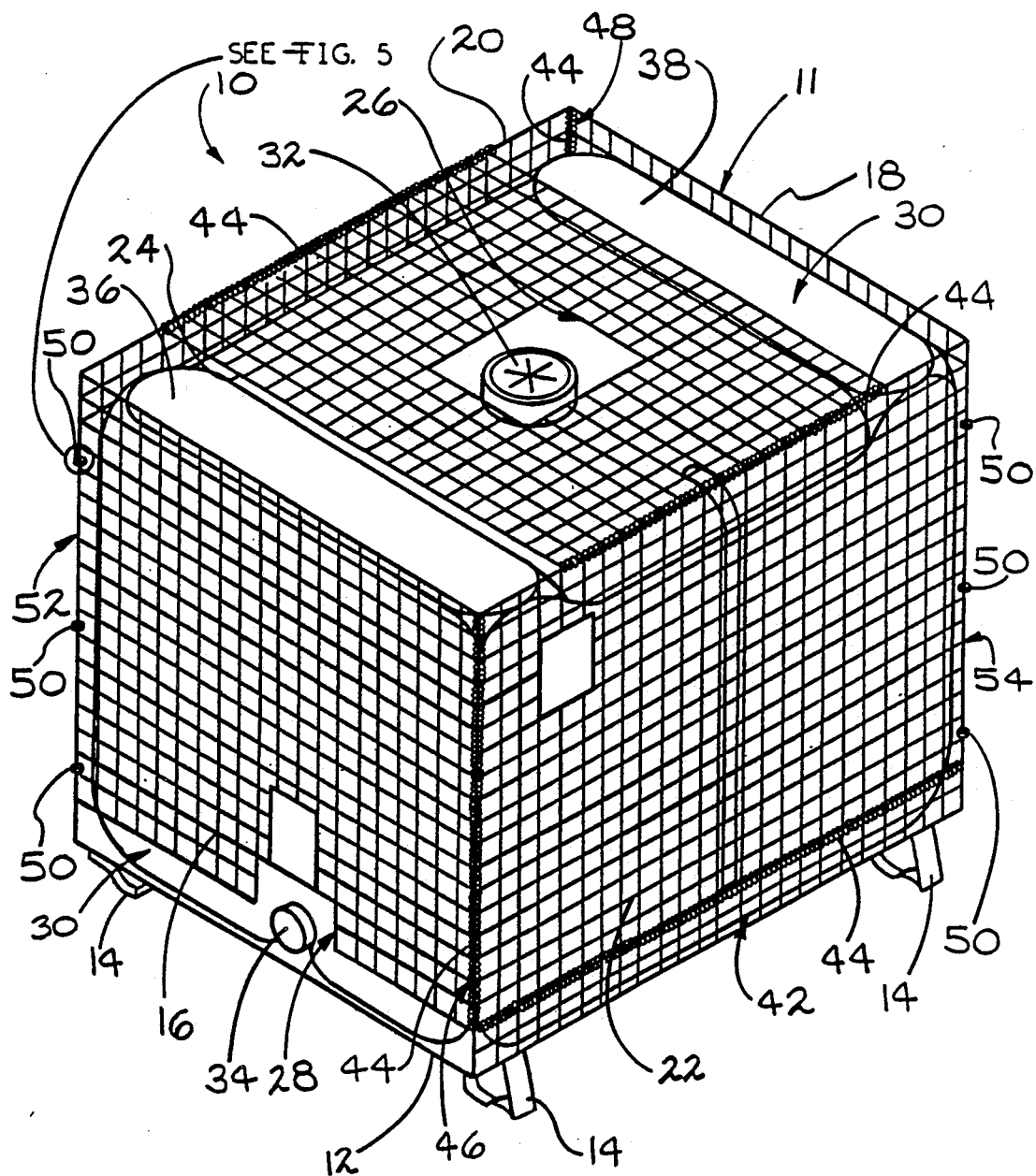
FIG. 1 is a perspective view of the shipping container of the present invention.
Figure 2:
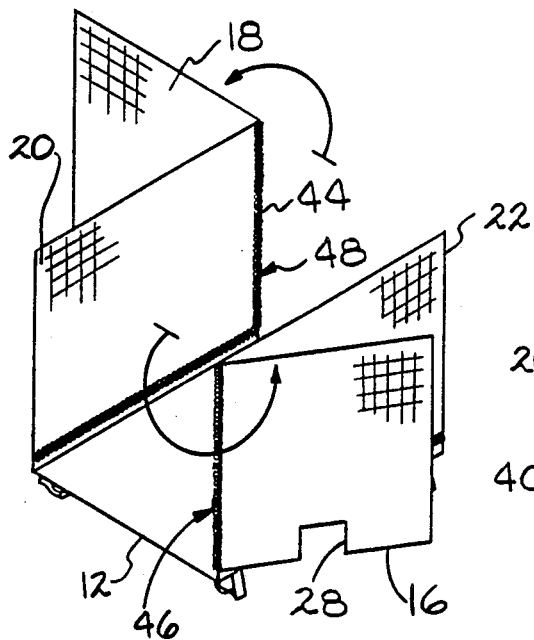
FIGS. 2, 3, and 4 are perspective views of the present invention detailing a folding sequence for one embodiment of the reusable shipping container.
Figure 3:
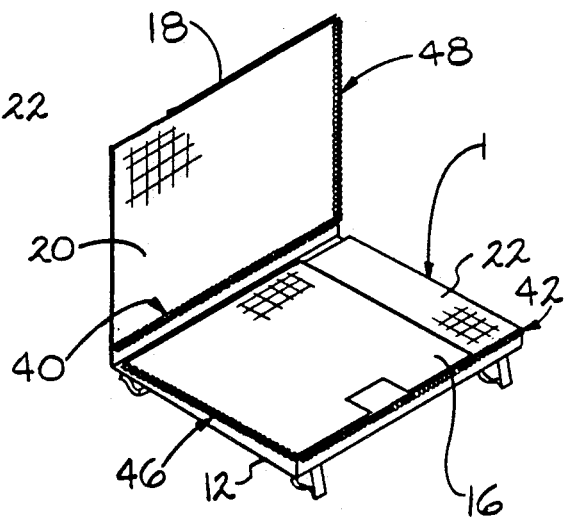
Figure 4:
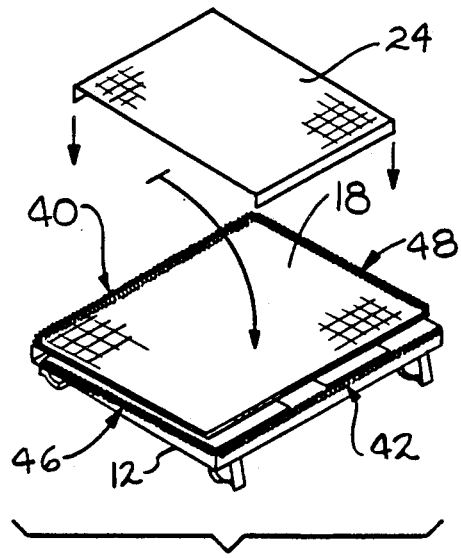
Figure 5:
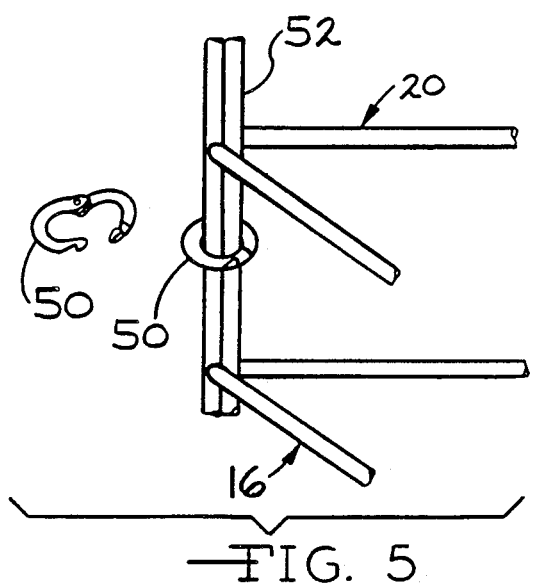
FIG. 5 is an enlarged perspective view of the construction of a portion of the shipping container shown in FIG. 1.

With reference to the drawing, the fold up wire frame shipping container of the present invention is indicated generally at 10 and consists of an outer container 11 and an inner tank 30. The present invention is illustrated in FIG. 1 as including a wire mesh bottom wall 12 having dependent legs 14. The legs 14 are spaced substantially apart so as to enable the insertion of forklift tines (not shown). This facilitates an increased ease in the handling of the container 10 during transportation and storage.

The outer container 11 further includes a substantially flat, wire mesh top wall 24 and a plurality of wire mesh side walls, designated as a front wall 16, a rear wall 18, a left wall 20 and a right wall 22. The dimensions of the side walls are such that opposing side walls (16, 18 and 20, 22) correspond in width, while all of the side walls correspond in height.

The top wall 24 has a central fill opening 26 and the front wall 16 has a discharge opening 28 located adjacent to the bottom wall 12. While the location of the fill opening 26 and the discharge opening 28 are specifically designated in the present embodiment, it will be appreciated that these locations may be altered so as to accommodate the fill and discharge fittings of the specific inner tank 30 being employed.

The liquid tight, unitary blow molded plastic inner tank 30 is disposed within the outer container 11 and has dimensions generally corresponding to those of the outer container 11. The tank 30 is positioned upright inside of the outer container 11 so that a fillcap and fitting 32 on the tank 30 project into the fill opening 26 of the top wall 24. A discharge fitting 34 on th inner tank 30 likewise extends into the discharge opening 28 of the front wall 16.

The inner tank 30 is of a thin wall construction so that, when filled with a liquid for transportation, the tank 30 is incapable of supporting itself upright without the structural aid of the side walls of the outer container 11. Reinforced, thickened support regions 36 and 38 extend transversely along the top front edge and top rear edge of the inner tank 30. When two full containers 10 are to be stacked upon each other, the front reinforced region 36 and the rear reinforced region 38 provide support surfaces for the dependent legs 14 of the second shipping container 10. For this reason, the top wall 24 is limited in size so as to not extend over either the front reinforced region 36 or the rear reinforced region 38. Alternatively, the top wall 24 could also be constructed so as to extend over both the front and rear reinforced regions 36 and 38 and provide further support for a second container 10.

The bottom wall 12 includes two upwardly extending portions along opposing edges, designated as a raised left edge portion 40 and a raised right edge portion 42. Respectively fastened by helical wire connectors 44 along their lower periphery, the left wall 20 is connected to the left edge portion 40 and the right wall 22 is connected to the right edge portion 42. The helical wire connectors 44 resemble elongated springs and define horizontal rotational axes for the side walls 20 and 22. While a helical wire connector 44 is used in the present embodiment, it is readily apparent that other convention means permitting this rotational attachment may be employed.

Rotatably connected by helical wire connectors 44 about vertical axes, the front wall 16 and rear wall 18 are fastened respectively to a front edge 46 of the right wall 22 and a rear edge 48 of the left wall 20. Additionally, the front wall 16 and rear wall 18 are releasably fastened by a plurality of snap loop connectors 50 along the front edge 52 of the left wall 20 and the rear edge 54 of the right wall 22, respectively. Completing assembly of the shipping container 10, the top wall 24 is releasably attached by helical wire connectors 44 to the top portions of the left wall 20 and right wall 22, so as to extend across the top of the inner tank 30 as previously mentioned. Again, other conventional fastening means may be substituted for the above connectors so long as release or rotation is premitted where appropriate.

Upon being emptied, the inner tank 30 is removed from the shipping container 10 by either releasing the snap loop connectors 50 of the front wall 16 or rear wall 18 and extracting the empty tank 30 therefrom, or removing the helical wire connectors 44 fastening the top wall 24 and withdrawing the inner tank 30 upwardly. Once the inner tank 30 is removed, it is then possible for the outer container 11 to be folded upon itself and occupy a minimum amount of cargo space during return to the original supplier.

The sequence of folding the wire mesh container 10 is initiated by removing the top wall 24. Once the connectors 44 retaining the top wall 24 ae removed, the connectors 44 and top wall 24 are set aside. The snap loop connectors 50 engaging the front wall 16 and the rear wall 18 are then respectively disengaged from the left wall 20 and the right wall 22. The front wall 16 is then rotated outwardly approximately 270° (or, alternatively, inwardly approximately 90° ) about the front edge 46 of the right wall 22 until lying generally adjacent and parallel to the right wall 22. The right wall 22, along with the now adjacent front wall 16, can then be rotated downward, about the right edge portion 42, onto the bottom wall 12. The rear wall 18 is likewise rotated outward approximately 270° (or inward approximately 90°) about the rear edge 48 of the left wall 20 until lying generally adjacent and parallel to the left wall 20. The left wall 20 and the now adjacent rear wall 18 are then rotated downward, about the left edge portion 40 of the bottom wall 12, onto the previously folded side walls 16 and 20. The container 11 is secured in the folded position by finally fastening the top wall 24 (positioned on top of the folded side walls 16, 18, 20 and 22) to the upward edge portions 40 and 42 of the bottom wall 12.

The container can now be easily and conveniently returned to the original supplier without occupying a significant amount of transportation space. After being received by the original supplier, the shipping containe 10 is reassembled for further use by reversing the aforementioned steps.

While the above description constitutes the preferred embodiment of the present invention, it will be appreciated that the invention is susceptible to modification, variation and change without departing from the proper scope and fair meaning of the accompanying claims.

I claim:

1. A reusable one-way shipping container comprising:
 a rectangular box shaped outer container including a bottom wall, upright side walls, and a substantially flat top wall, said bottom wall having a plurality of dependant legs, said top wall having a portion defining a fill opening, one of said side walls having a portion defining a discharge opening adjacent said bottom wall, said container side walls also being free of obstruction on the inner sides thereof;
 a collapsible plastic inner tank having thin side walls and being positioned interiorly of said outer container and being removable therefrom, said inner tank being maintained in an upright position by said outer container side walls when said tank is filled with liquid, said inner tank side walls freely and directly engaging the inner sides of said container side walls when said tank is filled with liquid, said tank also having an inlet fitting accessible from said fill opening and a discharge fitting accessible through said discharge opening; and means for enabling said top wall to be removed and said side walls of said outer container to fold into a substantially flat position on said bottom wall when said inner tank is removed from said outer container, means for securing said top wall on said folded side walls and retaining said container in said substantially flat position.

2. A reusable one-way shipping container as set forth in claim 1 wherein said inner tank further includes at least one integrally formed reinforced support region along an upper surface thereby enabling one shipping container to be stacked upon another.

3. A reusable one-way shipping container as set forth in claim 1 wherein said means enabling folding of said outer container includes said top wall being removably fastened to one pair of opposing side walls, a first pair of opposing side walls being rotatably connected along respective lower edges to corresponding edges of said bottom wall, a second pair of opposing sidewalls respectively being rotatably connected along individual side edges to corresponding side edges of said first pair of sidewalls, each of said second pair of side walls also being releasably connected along a remaining side edge to a corresponding remaining side edge of said first pair of side walls.

4. A bulk liquid material shipping container comprising:

a box shaped wire mesh outer container having a bottom wall including spaced apart dependent legs enabling the extension of forklift tines therebetween, a substantially flat top wall having a portion defining a central fill opening, a first pair of opposing side walls, a second pair of opposing side walls, one side wall having a portion defining a discharge opening adjacent to said bottom wall;

a liquid tight inner tank removably positioned upright inside of said outer container and having substantially thin walls, said tank including an inlet fitting extending into said container fill opening and a discharge fitting extending into said container discharge opening, said tank freely engaging and being maintained in an upright position by said inner sides of the container side walls when said tank is filled with a liquid, said tank further having a plurality of thick reinforced support regions extending along its upper surface, said support regions permitting a second container to be positioned thereupon and supported thereby when said tank is full of liquid; and means for enabling said side walls to fold into a substantially flat position on said bottom wall upon removal of said inner tank, said top wall being positioned over said side walls and secured to retain said side walls folded in a substantially flat position on said bottom wall.

5. A bulk liquid material shipping container as set forth in claim 4 wherein said enabling means includes said first pair of opposing side walls being rotatably attached along lower edges to said bottom wall, said second pair of opposing side walls each being rotatably attached along a side edge to corresponding side edges of said first pair of side walls, said second pair of side walls also being releasably attached along its remaining side edge to corresponding side edges of said first pair of side walls, said top wall being releasably attached along opposing edges to the correspoding upper edges of one pair of opposing side walls, whereby said releasable and rotatable attachement allows said second pair of side walls each to be rotated back upon said attached side wall and to be subsequently rotated down upon said bottom wall, said top wall being securable over said folded side walls to said bottom wall so as to retain said assembly in the folded position.

* * * * *